United States Patent Office 3,037,603
Patented June 5, 1962

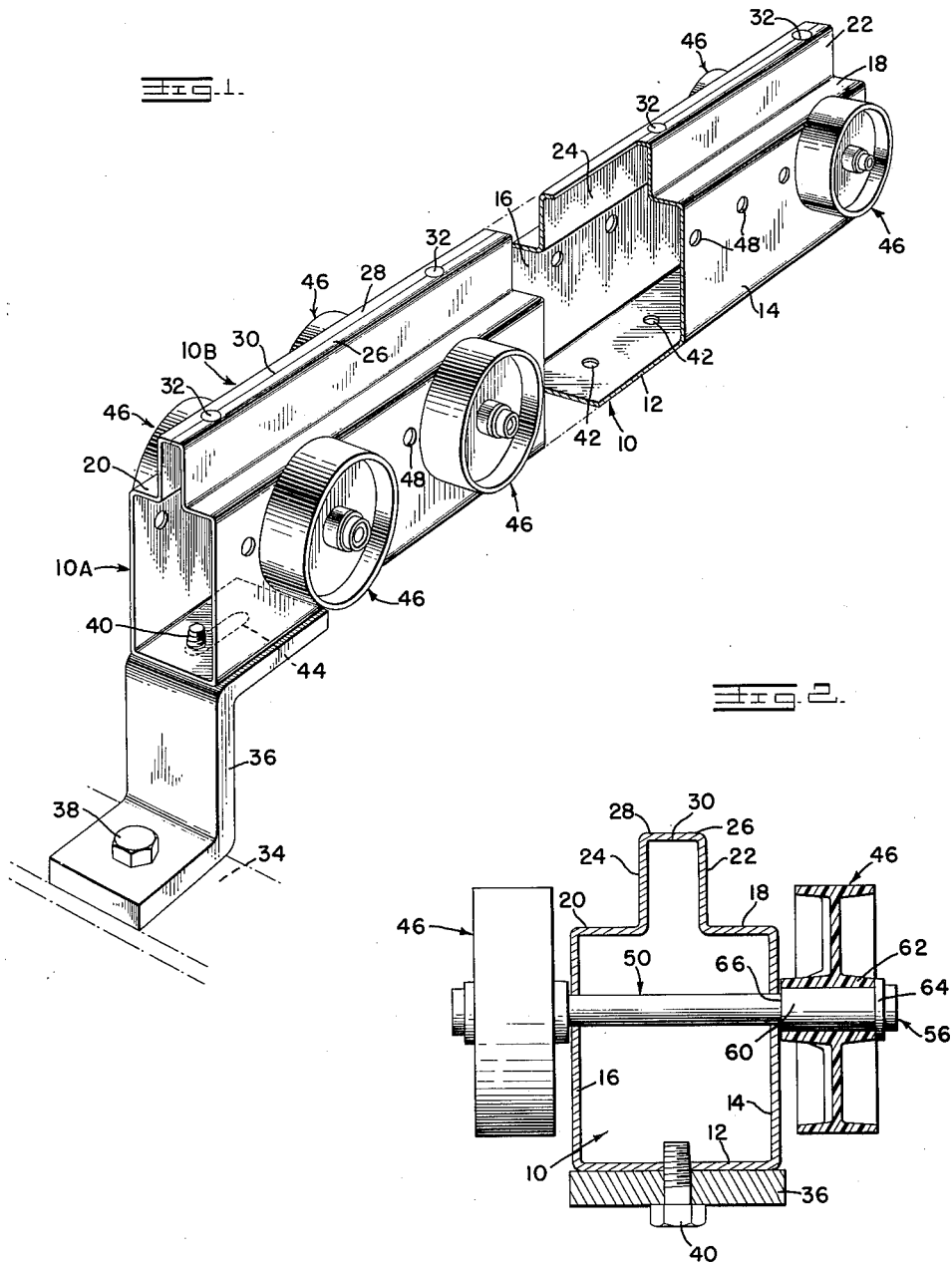

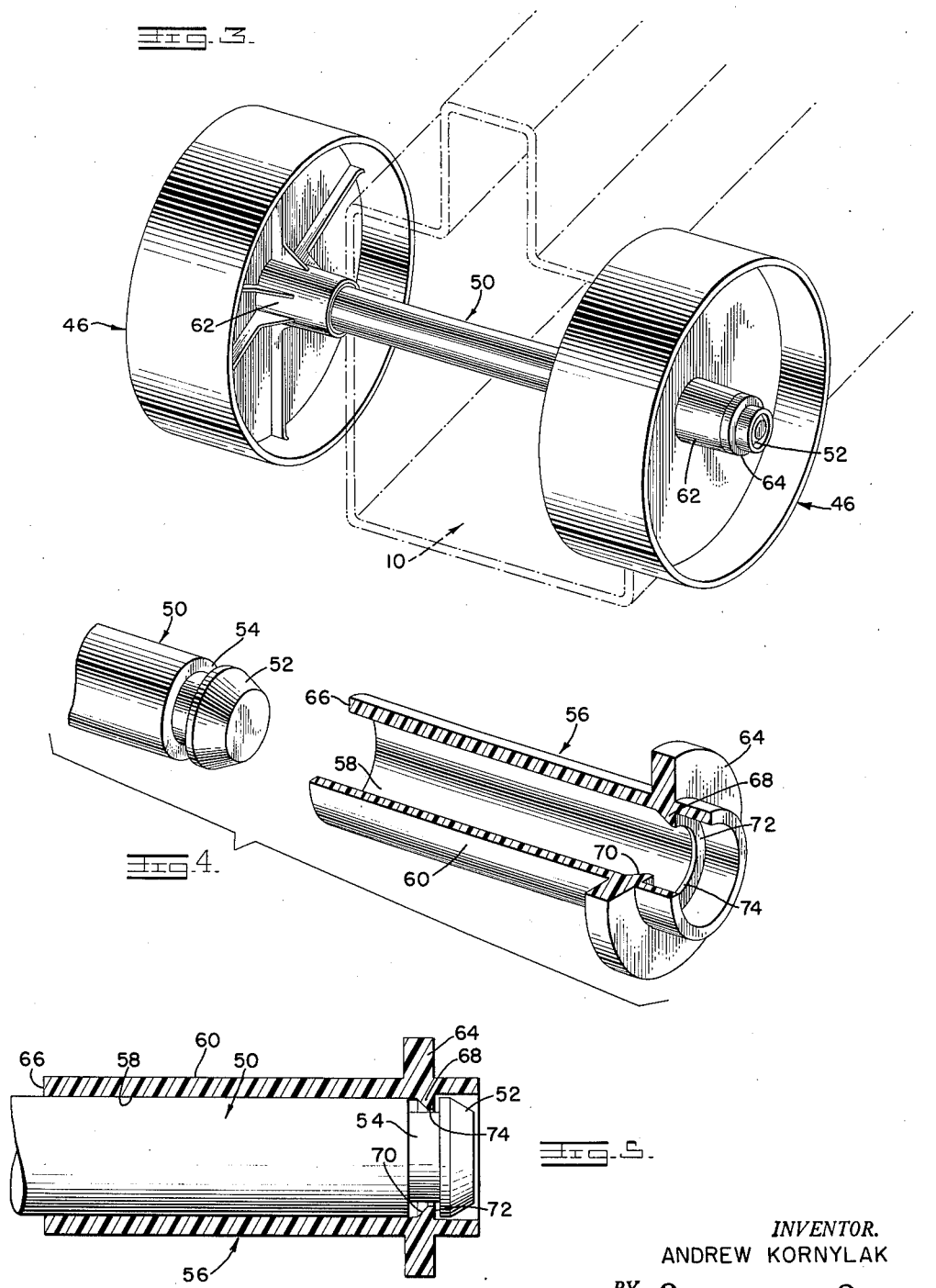

3,037,603
CONVEYOR RAIL AND ROLLER ASSEMBLY
Andrew T. Kornylak, Jersey City, N.J., assignor to Kornylak Corporation, Hamilton, Ohio, a corporation of New Jersey
Filed Apr. 21, 1959, Ser. No. 807,865
11 Claims. (Cl. 193—37)

This invention relates to apparatus for use in conveyors, and more particularly to a unique conveyor rail and roller assembly. The invention is especially useful in conveyors or storage racks which operate upon the gravity flow principle, but as will become apparent, the structures of the invention have wider applicability.

In a common form of gravity flow conveyor, packages or other articles are supported on and between parallel inclined rails and move along the same under the influence of gravity. Such a conveyor may be employed to move packages from carton sealers, production lines, or incoming trucks. Several pairs of conveyor rails are often employed for the transportation of articles in multiple lanes, each rail having a plurality of rollers which support the articles. Notwithstanding the simplicity of their operating concept, such conveyors have required expensive rail constructions, to obtain the desired torsional rigidity, and expensive roller assemblies, usually of the ball bearing type, to reduce friction in the movement of the articles along the rails.

It is accordingly a principal object of the invention to provide an improved conveyor rail and roller assembly.

Another object of the invention is to provide a unique tubular conveyor rail.

A further object of the invention is to provide a conveyor rail of the foregoing type which is bent from a single piece of material, which has a single seam, and which has high torsional rigidity.

Another object of the invention is to provide a conveyor rail of the foregoing type which affords versatility in the placement of cooperating rollers supported thereon and in the attachment of the rail to frame or base members.

Yet another object of the invention is to provide novel structure for supporting rotating or swinging members.

Still another object of the invention is to provide unique structure for supporting a roller or wheel on an axle.

A still further object of the invention is to provide a novel bearing sleeve or bushing for supporting a roller or wheel for rotation on an axle and for retaining the roller or wheel on the axle.

An additional object of the invention is to provide a novel assembly of roller, journal sleeve, and axle pin elements.

The foregoing objects, features, and advantages of the invention, and the manner in which the same are accomplished will become more readily apparent upon consideration of the following detailed description of the invention taken in conjunction with the accompanying drawings, which illustrate preferred and exemplary embodiments and wherein:

FIGURE 1 is a perspective view of the rail and roller assembly of the invention, with the rail partially cut away to expose its interior and with a bracket shown for attachment of the rail to a frame or base member;

FIGURE 2 is a transverse sectional view illustrating details of the construction of FIGURE 1;

FIGURE 3 is a perspective view illustrating an assembly of rollers, journal bushings, and axle pin and showing the rail in phantom;

FIGURE 4 is an exploded partly sectional perspective view of the journal sleeve and axle pin; and FIGURE 5 is a longitudinal sectional view illustrating the relationship of the journal sleeve and axle pin when they are properly assembled.

Briefly stated, the invention comprises a rail bent from a single sheet of material to form a rectangular shell with a divider wall projecting upwardly therefrom. Axle pins are passed through pairs of aligned holes in the opposed side walls of the shell and project beyond the side walls for the support of rollers thereon by interposed journal sleeves. The journal sleeves are constructed so as to provide a suitable bearing surface for rotation of the rollers on the axles and so as to retain the rollers on the axles.

Referring to the drawings, and initially to FIGURE 1 thereof, the invention comprises a tubular conveyor rail generally designated by reference numeral 10. The rail is preferably formed from a single piece of appropriate material, such as zinc-coated sheet steel, and is bent to the configuration illustrated. In the form shown the rail has a rectangular shell main body portion 10A constituted by a bottom panel 12, side walls 14 and 16, and top wall shoulders 18 and 20. The shoulders extend horizontally from the side walls to a vertical divider superstructure 10B constituted by vertical side walls 22 and 24, which terminate in edge portions 26 and 28 bent toward each other to form the top of the superstructure. The top portions 26 and 28 meet in a longitudinal seam 30 so as to form a butt joint, which may be readily closed as by spot welding indicated at 32. The cross-sectional configuration of the rail results in high torsional rigidity and is clearly shown in FIGURES 1 and 2.

To support the rail on frame or base members such as member 34 (indicated in phantom in FIGURE 1) brackets such as the angle bracket 36 may be employed. The brackets may be secured to members 34 as by bolts 38 and may be secured to the rail 10 at appropriate points as by self-tapping screws 40 (see FIG. 2). For this purpose suitable pre-punched holes 42 are spaced along the length of the bottom panel 12 of the rail. Versatility in the mounting of the rail is obtained by providing a plurality of holes 42, to permit selection of the bracket position and by providing the bracket with an elongated slot 44 (FIG. 1) through which the screw 40 passes, to permit adjustment of the rail along the bracket leg before the screw 40 is tightened.

In order that the rail may support rollers, such as those designated 46, pre-punched holes 48 are spaced along the length of the respective side walls 14 and 16 of the rail. The holes in one side wall are aligned with corresponding holes in the other to permit the passage of axle pins designated by reference numeral 50 (see FIGS. 2 and 3). If rollers are to be supported on opposite sides of the rail 10, the axle pins are made long enough to project beyond the respective side walls 14 and 16. In the event that rollers are to be supported only along one side wall of the rail, the axle pins may be shortened and provided with plain heads (not shown) which abut the outer surface of the other side wall. In the illustrative embodiment shown in the drawing, the axles are arranged to support rollers at both sides of the rail. The pins are cylindrical and may be formed of a material such as steel. The projecting portions of the axle pins are best shown in FIGURES 4 and 5. The extreme ends of the pins are tapered or frusto-conical as indicated at 52. Adjacent each of the tapered ends the pins are formed with an annular groove 54. The side surfaces of the groove are radial and preferably meet the cylindrical bottom surface of the groove and the adjacent external cylindrical surface of the axle pin in sharp corners.

In order to support the rollers for rotation on the axle pins and to retain the rollers on the pins, unique journal or bearing sleeves 56 are employed (see FIGS. 4 and 5).

These sleeves or bushings are preferably molded of a material such as high density polyethylene and are substantially coextensive with the projecting portions of the axle pins. The sleeves have internal cylindrical surfaces 58 which mate with the external cylindrical surfaces of the pins and external cylindrical surfaces 60 which provide smooth bearings for the mating internal cylindrical surfaces of the hubs 62 of wheels 46, as shown in FIG. 2. Adjacent one end of the journal sleeve is formed a radial circumferential flange or collar 64. The flange serves as a stop to retain the associated roller 46 on the axle pin when the bearing sleeve and axle pin are assembled in a manner to be described. When so assembled, the distance between the inner side of the flange (the side toward the adjacent side wall of the rail) and the remote end 66 of the bearing sleeve is substantially the same as the axial length of the hub 62 of the roller, and the end 66 lies closely adjacent the side wall of the rail (see FIG. 2).

To secure the bearing sleeves to the axle pins each bearing sleeve is formed with an internal annular rib 68 (FIGS. 4 and 5). The rib is tapered in cross-section, having an inner surface 70 inclined to the adjacent cylindrical surface of the bearing sleeve and an outer surface 72 substantially perpendicular to the cylindrical surface. These surfaces of the rib are joined at the rib apex by a short cylindrical surface 74. The rib 68 is preferably formed in substantially the same plane as the flange 64 and has a height slightly less than the depth of groove 54 of the axle pin.

To assemble the journal sleeve and the axle pin, the sleeve is oriented wtih respect to the pin as shown in FIGURE 4 and is then slipped onto the pin until the inclined surface 70 of the rib 68 engages the corresponding inclined surface of the tapered end 52 of the pin. While the pin is held against axial movement, sufficient pressure is exerted on the sleeve to force the rib 68 over the tapered end 52 of the pin and snap it into the groove 54. The inherent resiliency of the sleeve material permits this action. In a practical form of the invention the inclined surface at the end of the pin 50 may be at an angle of about 30° with respect to the cylindrical surface of the pin, and the inclined surface of the rib 68 may be at an angle of about 45° with respect to the cylindrical surface of the sleeve.

When the rib 68 has been snapped into the groove 54, it is made captive between the side surfaces of the groove, fixing the sleeve against substantial axial movement with respect to the pin. If an axle pin is inserted through a pair of aligned holes 48 of a rail and a bearing sleeve is slipped onto each pin end, the sleeves hold the pin in position on the rail by virtue of the abutting of the sleeve ends 66 and the rail side walls. Obviously, the rollers 46 must be slipped onto the corresponding sleeves before both sleeves are interlocked with the pin.

The rollers 46 are preferably molded of a suitable plastic, such as "cycolac." This provides a plastic-to-plastic bearing contact between the rollers and the bearing sleeves, resulting in smooth, quiet, and wear-resistant operation. The roller hubs may be joined to cylindrical or crowned rims by a web and spokes (see FIG. 3).

When the rail, axle pins, bearing sleeves, and rollers are fully assembled, the apparatus of the invention appears as in FIGURE 1. It will be noted that the diameter of the rollers is correlated with the height of the holes 48 and the height of the shoulders 18 and 20 so that the rollers project above the shoulders but yet are lower than the top portions 26 and 28 of the rail. With this construction, packages or other articles may be supported on the rollers, spanning the distance between the rollers at one side of one rail and the opposing rollers at the other side of another rail. The vertical walls 22 or 24 at the opposite sides of the articles will serve to guide and prevent substantial lateral movement of the articles in their passage along the rails.

It is apparent from the foregoing description that the invention provides unique and improved conveyor structure. The rail of the invention is easy to manufacture, yet has the desired torsional rigidity. The tubular configuration resists the distorting effects of unbalanced loads on the two sides of the rail, and the shoulders provide extra distance between the divider superstructure and the rollers. The rail is also versatile in the manner in which it may be supported and in which it in turn may support rollers. The roller units of the invention are simple to manufacture and assemble and yet operate effectively.

While preferred embodiments of the invention have been shown and described, it will be apparent to those skilled in the art that changes can be made without departing from the principles and spirit of the invention, the scope of which is defined in the appended claims. For example, the cylindrical portion of the bearing sleeve which surrounds the tapered end of the axle pin might be eliminated in a modification, and the bearing sleeve might be employed to support different types of rotating or swinging members in the machinery, instrument, appliance, or other fields. Accordingly, the foregoing embodiments are to be considered illustrative of the invention, rather than restrictive, and those modifications which come within the meaning and range of equivalency of the claims are to be included therein.

The invention claimed is:

1. In combination, a roller rail comprising an elongated, hollow, rectangular shell including vertical side walls and having a vertical-walled divider projecting above the top thereof, the entire rail being formed from a single piece of sheet metal, and having a single, longitudinal seam along the top of said divider and spot welded along the length of said seam, said divider forming with said shell longitudinal shoulders, the vertical side walls of said shell being provided with regularly spaced pre-punched holes, a plurality of axles passing through pairs of said holes with the ends thereof projecting beyond the vertical side walls of said shell, said axles being provided with annular grooves in said projecting ends thereof, plastic journal sleeves snugly fitting the projecting ends of said axles and being substantially coextensive in length with said projecting ends, said sleeves having internal annular retaining ribs snap-fitted in said annular grooves of said axles, a plurality of plastic rollers mounted for rotation about said plastic journal sleeves, said rollers being provided with hubs, and said plastic sleeves having circumferential projecting flanges for retaining engagement with the hubs of said rollers, said rollers projecting above said shoulders of the shell, and said divider projecting above said rollers.

2. In combination, a roller rail comprising an elongated, hollow, rectangular shell including vertical side walls and having a vertical-walled divider projecting above the top thereof, said divider forming with said shell longitudinal shoulders, the vertical side walls of said shell being provided with regularly spaced pre-punched holes, a plurality of axles passing through pairs of said holes with the ends thereof projecting beyond the vertical side walls of said shell, said axles being provided with annular grooves in said projecting ends thereof, journal sleeves snugly fitting the projecting ends of said axles and being substantially coextensive in length with said projecting ends, said sleeves having internal annular retaining ribs snap-fitted in said annular grooves of said axles, a plurality of rollers mounted for rotation about said journal sleeves, said rollers being provided with hubs, and said sleeves having circumferential projecting flanges for retaining engagement with the hubs of said rollers, said rollers projecting above said shoulders of the shell, and said divider projecting above said rollers.

3. In combination, a roller rail comprising an elongated, hollow, rectangular shell including vertical side walls and having a vertical-walled divider projecting above the top thereof, said divider forming with said shell longitudinal shoulders, the vertical side walls of said shell being provided with regularly spaced holes, a plurality of axles passing through pairs of said holes with the ends thereof projecting beyond the vertical side walls of said shell, said axles being provided with annular grooves in said projecting ends thereof, journal sleeves snugly fitting the projecting ends of said axles, said sleeves having internal annular retaining ribs snap-fitted in said annular grooves of the axles, a plurality of rollers mounted for rotation about said journal sleeves, and said journal sleeves having circumferential projecting flanges for retaining engagement with said rollers, said rollers projecting above said shoulders of the shell, and said divider projecting above said rollers.

4. In combination, a roller rail comprising an elongated, hollow, rectangular shell including vertical side walls and having a vertical-walled divider projecting above the top thereof, said divider forming with said shell longitudinal shoulders, the vertical side walls of said shell being provided with regularly spaced holes, a plurality of axles passing through pairs of said holes with the ends thereof projecting beyond the vertical side walls of said shell, journal sleeves snugly fitting the projecting ends of said axles, means for interlocking said sleeves with said axles, a plurality of rollers mounted for rotation about said sleeves, and said sleeves having circumferential projecting flanges for retaining engagement with said rollers, said rollers projecting above said shoulders of the shell, and said divider projecting above said rollers.

5. In combination, a roller rail comprising an elongated, hollow tube having a bottom wall between a pair of side walls which extend upwardly from the lateral extremities of the bottom wall, a pair of spaced shoulders extending toward each other from the upper extremities of said side walls, a pair of divider walls extending upwardly from the adjacent extremities of said shoulders, respectively, and a top wall extending between the upper extremities of said divider walls, each of said side walls having a row of holes therethrough along its length with the holes of one side wall aligned with the holes of the other, axles passing through pairs of said aligned holes and having at least one end projecting outwardly beyond an adjacent side wall, and rollers mounted for rotation on the projecting ends of said axles, said rollers extending upwardly beyond said shoulders to support articles thereon which are guided by the adjacent divider wall.

6. The combination of claim 5, said rail having a row of rail mounting holes through said bottom wall along its length adapted to receive self-tapping screws.

7. The combination of claim 6, further comprising a mounting bracket having an elongated slot therein, and a self-tapping screw extending through said elongated slot in the bracket and into one of said holes in the bottom wall of said rail.

8. The combination of claim 5, said axles comprising pins having bearing sleeves on said projecting ends for supporting said rollers.

9. The combination of claim 5, said bottom wall, said side walls, and said shoulders defining a rectangular cross-sectional configuration surmounted by a super-structure of rectangular cross-sectional configuration defined by said divider walls and said top wall.

10. The combination of claim 5, said rail having a longitudinal seam extending along the length of said top wall, the portions of said top wall on the respective sides of said seam being joined by a welding at said seam.

11. In combination, a roller rail comprising an elongated hollow tube having a bottom wall between a pair of side walls which extend upwardly from the lateral extremities of the bottom wall, a pair of spaced shoulders extending toward each other from the upper extremities of said side walls, a pair of divider walls extending upwardly from the adjacent extremities of said shoulders, respectively, and a top wall extending between the upper extremities of said divider walls, and rollers mounted on said side walls, said rollers extending upwardly beyond said shoulders to support articles thereon which are guided by the adjacent divider wall.

References Cited in the file of this patent
UNITED STATES PATENTS

| | | |
|---|---|---|
| 991,603 | Brooks | May 9, 1911 |
| 2,497,224 | Laure | Feb. 14, 1950 |
| 2,754,064 | Voltz et al. | July 10, 1956 |
| 2,823,780 | Gross | Feb. 18, 1958 |
| 2,889,907 | Sullivan | June 9, 1959 |
| 2,898,160 | Hamman | Aug. 4, 1959 |
| 2,913,284 | Zankl | Nov. 17, 1959 |